United States Patent
Nielander

[15] 3,669,415
[45] June 13, 1972

[54] MACHINE FOR MIXING, PLASTICATING AND PRESSING OUT OF PLASTICS, RUBBER AND OTHER HIGHLY VISCOUS MATERIALS AT CONTROLLED PRESSURE

[72] Inventor: Henrik Nielander, Schaufelbergerstrasse 58, CH-8055 Zurich, Switzerland

[22] Filed: Feb. 10, 1970

[21] Appl. No.: 10,215

[30] Foreign Application Priority Data

Feb. 11, 1969 Switzerland .......................... 2011/69

[52] U.S. Cl. .............................................. 259/12, 259/92
[51] Int. Cl. ....................................................... B01f 9/02
[58] Field of Search ................... 259/10, 47, 2, 9, 3, 12, 17, 259/19, 27, 35, 40, 41, 59, 91; 18/30

[56] References Cited

UNITED STATES PATENTS

| 2,377,069 | 5/1945 | Brubaker | 259/10 |
| 2,739,879 | 3/1956 | Bates | 259/47 |
| 2,859,017 | 11/1958 | Trumbull | 259/2 |
| 2,948,920 | 8/1960 | Hausman | 259/2 |
| 3,023,455 | 3/1962 | Geier | 259/2 |
| 3,183,553 | 5/1965 | Slater | 259/9 |

Primary Examiner—Robert W. Jenkins
Attorney—Littlepage, Quaintance, Wray & Aisenberg

[57] ABSTRACT

A mixing and plasticating machine which comprises a mixing and plasticating cylinder, an axially movable mixing and plasticating rotor with passages, the shaft of said mixing and plasticating rotor being connected to a rotary drive outside the mixing and plasticating cylinder, and an axially movable pressing piston. Said mixing and plasticating rotor and said pressing piston are axially movable independently of each other in said mixing and plasticating cylinder.

20 Claims, 8 Drawing Figures

MACHINE FOR MIXING, PLASTICATING AND PRESSING OUT OF PLASTICS, RUBBER AND OTHER HIGHLY VISCOUS MATERIALS AT CONTROLLED PRESSURE

This invention relates to a machine for mixing, plasticating and pressing out or extruding of plastics, rubber, and other highly viscous materials at controlled pressure. Particularly, the machine according to the invention may be used as a high-intensity mixer for plastics and rubber, the ready mixtures prepared being processed further, e.g., on a calander, or the machine may also be used as a platicating machine, the plasticated material being pressed, injected or extruded into a mold. In both cases, the mixing and plasticating cylinder of the machine according to the invention may be emptied at a controlled pressure and at a controlled speed. The machine according to the invention may also be used as a mixing machine for materials in paste form, powder form or liquid form.

In U.S. Pat. No. 3,623,703 a machine for mixing and plasticating of plastics, rubber and other highly viscous materials at controlled pressure, friction and shear conditions is described. Said machine is, i.a., characterized by the fact, that an axially movable mixing and plasticating rotor with passages of any desired cross-sectional configuration is pressed through the mixing and plasticating material, the mixing and plasticating material being pressed through the passages of said mixing and plasticating rotor in similarity to maccaroni, i.e., in the form of strings or ribbons. During the simultaneous rotation and axial motion of the mixing and plasticating rotor these material parts, similar to strings, are sheared off continuously and forced together in radial direction as well as in axial direction, so that controlled shear forces or shear gradients of any desired value may be attained. Moreover, as the mixing and plasticating material is pressed against the rotor area between the passages of the mixing and plasticating rotor, controlled friction forces of any desired value may be attained, these friction forces, as known, being very important to the mixing and plasticating process, even in the molecular area. The mixing and plasticating process being performed by the above-described machine is extremely intensive and the machine is suitable not only for mixing and plasticating of highly viscous elastomers but also for mixing and plasticating of plastics in granular form, powder form and in the form of solid pieces or rods.

The advantages of said machine when used as a high-performance mixer for plastics, rubber and other highly viscous materials have been described in detail in the above mentioned patent specification. The new machine according to the present invention has as an additional advantage that the ready mixed and/or plasticated batch may be pressed, pushed or extruded out of the mixing and plasticating cylinder in one sequence and at controlled pressure of any high value and that the cleaning of the machine is additionally simplified.

In the use of the machine according to the present invention as a plasticating machine for injection moulding machines, presses, blow-molding machines, etc., i.a., the following objects and advantages should be provided:

1. The machine according to the invention should be capable to plasticate not only granular or powdery plastic material, but also solid material in the form of pieces, blocks or rods. Thermoplastic materials as well as thermosetting or duroplastic materials may be used. If desired, the thermosetting molding materials may be in tablet form or piece form.

2. It should be possible to perform any desired mixing processes in the mixing and plasticating cylinder. Thus, for example, it should be possible to mix any desired colorants, filling agents and reinforcing agents (glass fibers, etc.) homogeneously with the plastic or elastomer material directly in the mixing and plasticating cylinder. When processing, e.g., rubber compounds by pressure molding, transfer molding or injection molding it should, if desired, be possible to mix the fillers and curing agents (vulcanization agents) homogeneously with the rubber directly in the mixing and plasticating cylinder, thus eliminating a separate mixing or granulation of the rubber compound.

3. As the mixing and plasticating means of the machine according to the present invention, i.e., the mixing and plasticating rotor, also may be manufactured with a very large diameter and at much lower manufacturing cost compared to, e.g., the plasticating screws of prior art, it should be possible to manufacture the mixing and plasticating cylinder also with a very large cylinder diameter and cylinder volume. With the machine according to the present invention it should be possible to mix and/or plasticate amounts of material of up to about 44 Imp. gal. (200 liters) or more in a very short time and to inject or press the material into a mold.

4. The machine according to the present invention should be designed so that the mixing and plasticating cylinder and the mixing and plasticating means may be cleaned very rapidly and easily and repaired or substituted.

5. It should also be possible to use the machine according to the present invention for the mixing of liquid plastics or resins, such as two-component-resins. As such, e.g., epoxies, polyesters, polyurethanes, silicones, and thiocoles may be mentioned. It should be possible to meter these plastics or resins in the mixing and plasticating cylinder of the machine according to the present invention and, if desired, mix said plastics or resins homogeneously with the necessary colorants, fillers or reinforcing agents, such as glass fibers. Thereafter, it should be possible to press or inject the ready-mixed reaction mixture into a mould in one shot or sequence or it should also be possible to press out or extrude the mixture from the mixing and plasticating cylinder portion-wise in order to process the material by handlayup or by brushing.

6. It should also be possible to use the machine according to the present invention for the injection molding or pressure molding of thermoplastic materials with added blowing-agents, the thermoplastic material being intensively and homogeneously mixed with the blowing agent in the mixing and plasticating cylinder and, thereafter, injected or pressed into a mold, the thermoplastic being foamed by action of the blowing agent and a moulded article with hard-foam-structure is formed (structural thermoplastic foam).

7. The shortcomings and drawbacks of the screw-plasticating devices of prior art with respect to leak-flow or back-flow between the screw threads and the accompanying pressure losses should as far as possible be avoided in the machine according to the present invention.

The machine according to the present invention for mixing, plasticating and pressing out of plastics, rubber and other highly viscous materials at controlled pressure comprises a mixing and plasticating cylinder, an axially movable mixing and plasticating rotor with passages of any desired cross-sectional configuration, the shaft of said mixing and plasticating rotor being connected to a rotary drive outside said mixing and plasticating cylinder, and an axially movable pressing piston, said mixing and plasticating rotor and said pressing piston being axially movable independently of each other in said mixing and plasticating cylinder.

Said shaft of said mixing and plasticating rotor may be guided out of said mixing and plasticating cylinder through said pressing piston, the pressing-out of the ready mixed or plasticated material being effected through the end opening of the mixing and plasticating cylinder opposite to the pressing piston. In this case, the shaft of the mixing and plasticating rotor may be guided in a guide bushing in the pressing piston. However, the shaft of the mixing and plasticating rotor may also be guided through an end closure of said mixing and plasticating cylinder opposite to the pressing piston, the pressing-out of the ready mixed or plasticated material being effected through a side opening of the mixing and plasticating cylinder. In the latter case, the pressing-out of the material also may be effected via a bore in the pressing piston proper.

In order that the invention may be more clearly understood, some embodiments thereof will now be described, by way of example, with reference to the accompanying drawings in which.

Figure 7:
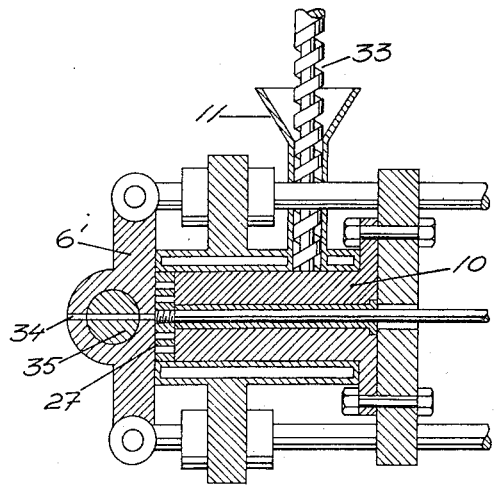
FIG. 7 illustrates the longitudinal sectional view according to FIG. 3, however, the ready mixed or plasticated material being pressed out via a lockable orifice in the end closure of the mixing and plasticating cylinder, the feed of the material being provided by a feeding screw.
Figure 8:
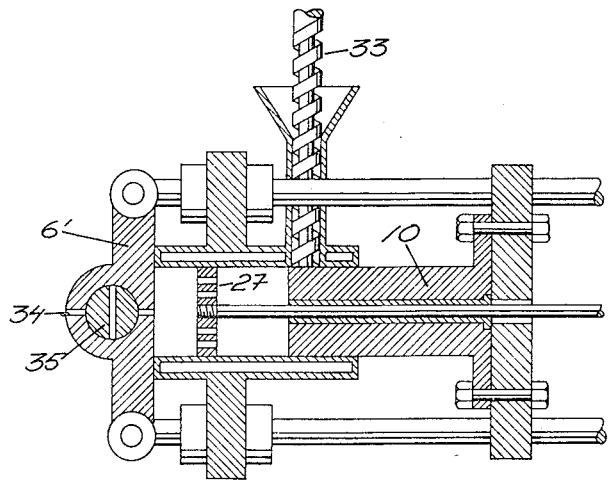

FIG. 8, finally, illustrates the longitudinal sectional view according to FIG. 7, with the pressing piston and the mixing and plasticating rotor in mixing and plasticating position and with locked orifice.

Figure 1:
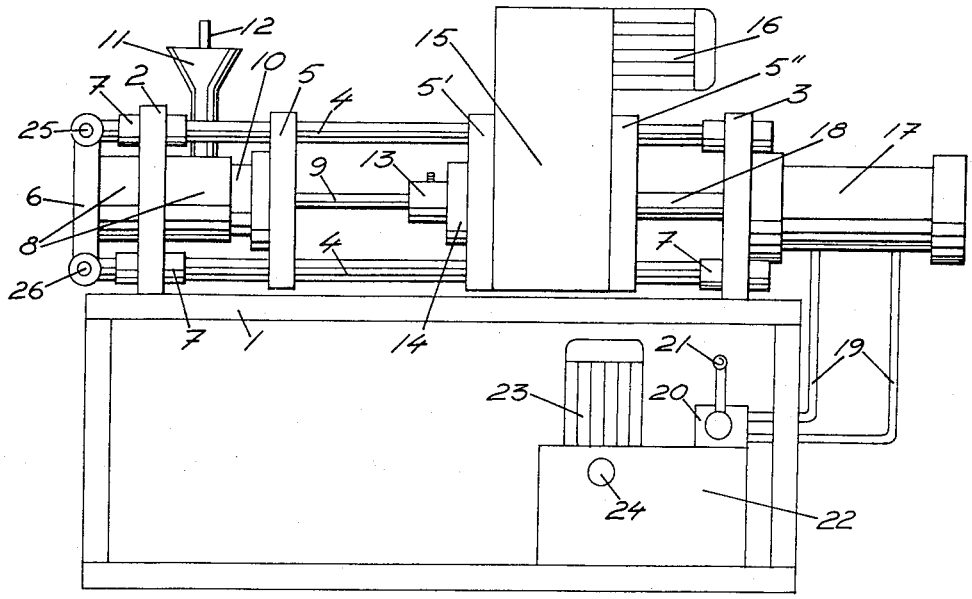
FIG. 1 is a side elevational view of a machine according to the invention, the side working cylinders for the axial motion of the pressing piston being not illustrated for the sake of clarity.

The drawings are hereinafter explained in detail:

Referring to FIG. 1, the machine illustrated comprises a machine base 1, on which the two fixed platens 2 and 3 are mounted. These two platens are firmly mounted on 1. The platens 2 and 3 are firmly connected to each other by four tie rods 4 as well as the tie rod nuts 7, so that the press structure of a horizontal four-column press is formed. Between the platens 2 and 3 and on the tie rods 4 three axially movable platens 5, 5' and 5'' are provided. The mixing and plasticating cylinder 8 is guided through a bore of the fixed platen 2 and firmly connected to this. At the end of tie rods 4, a swivel-mounted platen 6 is provided, this platen serving as an end closure of the mixing and plasticating cylinder 8. The swivel-mounted platen 6 is mounted on the swivel-bolts 25 and is secured against the mixing and plasticating cylinder 8 by the removable locking bolts 26. 6 may be swiveled horizontally as well as vertically. 9 is the shaft of the mixing and plasticating rotor, said shaft being guided out of the mixing and plasticating cylinder 8 via a seal bushing in the pressing piston 10. 11 is the feeding hopper of the mixing and plasticating cylinder 8 and 12 is the shaft rod of a feeding ram or a feeding screw. The shaft 9 is connected to the drive shaft of the rotary drive 15, 16 via the coupling 13, the bearing housing being illustrated as 14. The rotary drive 15, 16 is mounted between the tow axially movable platens 5' and 5'', 15 being the gear box and 16 the motor. At the fixed platen 3 a double-action working cylinder, in this case a hydraulic cylinder, is mounted. The piston rod 18 of the hydraulic cylinder 17 is firmly connected to platen 5''. By action of the piston rod 18 of hydraulic cylinder 17, the rotary drive 15, 16 may be axially moved on the tie rods and, thus, the shaft 9 with the mixing and plasticating rotor may be axially moved in the mixing and plasticating cylinder at a controlled pressure force of any desired value and at a controlled torque of any desired value. 19 represents the oil lines of hydraulic cylinder 17 and 20 is a hydraulic valve with a pressure control valve. 21 is the switch lever for the actuation of said hydraulic valve and 22 is the hydraulic pump group with oil container. 23 is the motor of the hydraulic pump group and 24 is a manometer.

Figure 2:
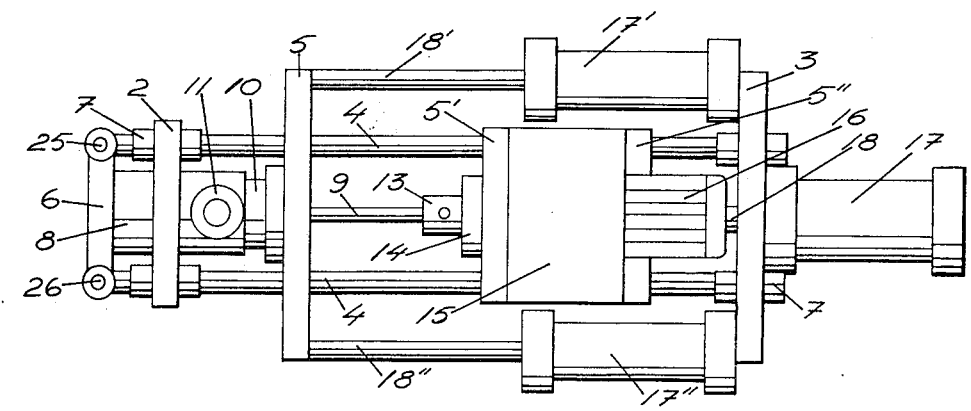
FIG. 2 is a plain elevational view of the machine as illustrated in FIG. 1, the side working cylinders being illustrated.

FIG. 2 is a plain elevational view of the machine according to FIG. 1, illustrating the two side hydraulic cylinders 17' and 17'', which are not represented in FIG. 1. These two double-action hydraulic cylinders are used for the axial motion and positioning of the pressing piston 10, the latter being mounted at the axially movable platen 5. The hydraulic cylinders 17' and 17'' are mounted at the fixed platen 3 and the corresponding piston rods 18' and 18'' are firmly connected to the axially movable platen 5. 17' and 17'' work in simultaneous action and are also connected to the hydraulic pump group 22 (FIG. 1). However, they are actuated totally independently of 17 by a separate hydraulic valve.

Figure 3:
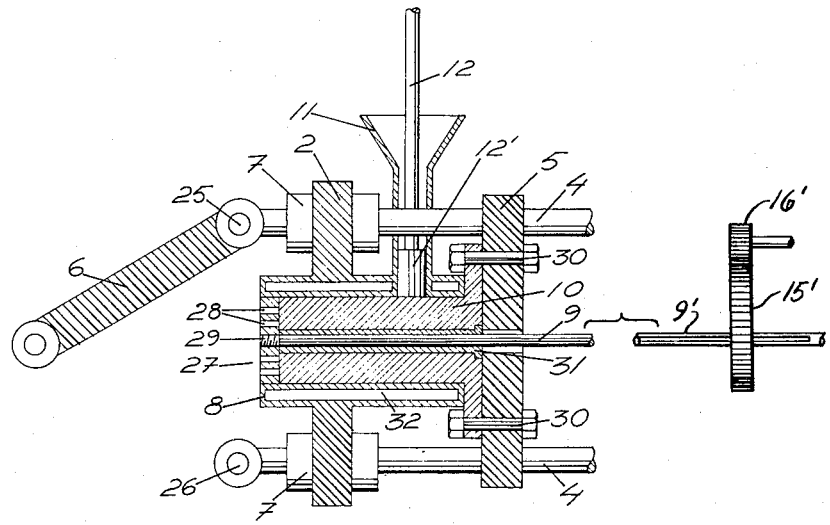
FIG. 3 is vertical a longitudinal sectional view of the mixing and plasticating cylinder of the machine illustrated in FIG. 1 together with the mixing and plasticating rotor and the pressing piston, the mixing and plasticating cylinder being opened and after completed pressing-out process.

In FIG. 3, 27 is the mixing and plasticating rotor with the passages or openings 28. The passages may be cylindrical or conical bores or may have a slot cross-section or polygonal cross-section. The mixing and plasticating rotor is via its thread 29 firmly screwed together with the shaft 9, the threading direction being selected so that the thread is not loosened at the rotation. Of course, the mixing and plasticating rotor and the shaft 9 may also be manufactured in one piece. The pressing piston 10 is via the bolts 30 mounted at the axially movable platen 5. 31 is a seal bushing in the pressing piston 10 for the shaft 9 of the mixing and plasticating rotor. The seal bushing is according to FIG. 3 easily inter-changeable and it may be manufactured of bronze, sintered bronze, heat resistant plastic material or other suitable materials. Other suitable seal boxes may also be used. 32 is a jacket for cooling or heating of the mixing and plasticating cylinder 8. The latter may also be electrically heated, of course. The mixing and plasticating rotor may also be made hollow and it may be heated or cooled via shaft 9, which in this case is provided as a hollow shaft. Also the pressing piston 10 may be partly hollow and it may be cooled or heated. 12' is the feeding ram connected to the feeding ram rod 12. The feeding ram may for example be actuated pneumatically or hydraulically and during the mixing, plasticating and pressing-out process it is locked in the position illustrated in FIG. 3. The piston rods 18' and 18'', respectively, of FIG. 2 are for the sake of clarity not illustrated in FIG. 3. The pressing piston 10 may be provided with seal rings, seal sleeves, etc. in the usual manner.

As shown in the right-hand side of FIG. 3, drive gear 15' is slidably connected to shaft 9 by splines 9'. Drive gears 16' and 15' are mounted within a rotary drive which is fixed with respect to the mixing and plasticating cylinder, in an alternate embodiment of the invention.

The function of the machine described above is explained with respect to FIGS. 4 to 6. These figures illustrate a horizontal longitudinal sectional view of the mixing and plasticating cylinder according to FIG. 2 with different positions of the mixing and plasticating rotor and the pressing piston.

Figure 4:
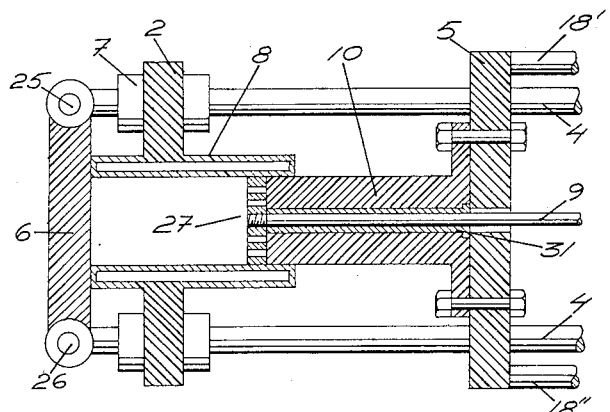
FIG. 4 is a horizontal longitudinal sectional view of the mixing and plasticating cylinder of the machine as illustrated in FIG. 2 with the pressing piston and the mixing and plasticating rotor in the start position before the beginning of the mixing or plasticating process.
Figure 5:
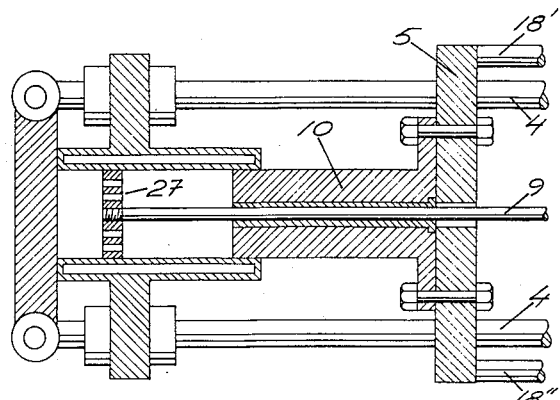
FIG. 5 illustrates the longitudinal sectional view according to FIG. 4, the pressing piston being held in unchanged position, whereas the mixing and plasticating rotor is axially moved in the mixing and plasticating cylinder, thereby performing the necessary number of strokes.

FIG. 4 illustrates the starting position of the mixing and plasticating rotor 27 and the pressing piston 10, the mixing and plasticating cylinder on one hand being closed by the swivel-mounted platen 6 and on the other hand by the pressing piston 10. In this position, the material to be mixed or plasticated may be fed into the mixing and plasticating cylinder by the feeding ram 12, 12' according to FIG. 3, and, thereafter, the feeding ram is locked in the position illustrated in FIG. 3. Then, according to FIG. 5, the mixing and plasticating rotor 27 is axially moved back and forth by action of the hydraulic cylinder 17 in the mixing and plasticating cylinder at simultaenous rotation until the number of strokes necessary to complete the mixing or plasticating process has been performed. The pressing piston is hold in the start position during the mixing or plasticating process by locking the hydraulic cylinders 17' and 17'' in the start position. However, the pressing piston may also be used to compress or increase the pressure of the cylinder contents during the mixing or plasticating process, and, thus, the volume of the mixing and plasticating cylinder may be reduced to a desired degree during the mixing or plasticating process.

After the number of strokes necessary for the mixing and plasticating process has been performed, the mixing and plasticating rotor is moved to the start position according to FIG. 4 again. In order to press out the ready mixed or plasticated batch, the end closure of the mixing and plasticating cylinder is opened, i.e., the swivel-mounted platen 6 is swiveled out, and then all three hydraulic cylinders 17, 17', and 17'' are actuated in simultaneous action, so that the pressing piston 10 together with the mixing and plasticating rotor 27 is performing a complete stroke in the mixing and plasticating cylinder, see FIG. 3. From FIGS. 3 and 4 it is seen that the mixing and plasticating rotor 27 covers the seal bushing 31 in a valve-like manner during the pressing-out process, so that even at very high pressing-out pressure no material is pressed through the seal bushing. The mixing and plasticating rotor may be rotary or non-rotary during the pressing-out process.

After completed pressing-out process the pressing piston is moved to the start position again together with the mixing and plasticating rotor as illustrated in FIG. 4 and the same mixing or plasticating process may be repeated after the end opening of the mixing and plasticating cylinder has been closed again and new material has been fed into the mixing and plasticating cylinder.

Figure 6:
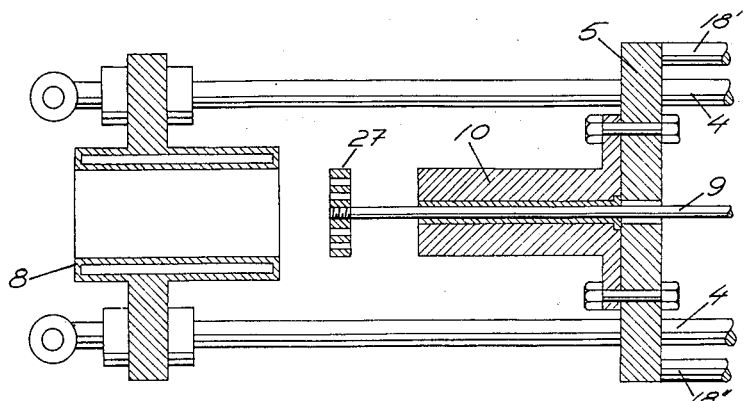
FIG. 6 illustrates the longitudinal sectional view according to FIGS. 4 and 5, the pressing piston as well as the mixing and plasticating rotor being pulled out of the mixing and plasticating cylinder for cleaning or repair of the machine.

FIG. 6 illustrates the pressing piston 10 and the mixing and plasticating rotor 27 pulled out of the mixing and plasticating cylinder. The swivel-mounted platen 6 has been removed. From FIG. 6 it is seen that the parts of the machine according to the present invention which come in contact with the mixing or plasticating material are extremely easily accessible for cleaning, repair or exchange of wear parts. This is a substantial advantage at the practical operation of the machine. The mixing and plasticating rotor 27 may easily be dismounted from the machine by dismounting the shaft 9 from the coupling 13 (FIG. 1). Then, the mixing and plasticating cylinder 8 is completely freely accessible and open from both ends, as illustrated in FIG. 6.

FIG. 7 illustrates an embodiment of the machine according to the present invention being particularly suitable as a plasticating machine for injection moulding machines, moulding presses and blow moulding machines, etc. The machine according to FIG. 7 differs from the embodiment illustrated in FIG. 3 by the swivel-mounted platen 6', which has been provided with an orifice 34, as well as an orifice-closure 35, the latter being rotary in valve-like manner. Of course, other usual orifice-closures may also be used. Instead of the feeding ram 12, 12' of FIG. 3 in this case a rotary feeding screw 33 is provided, said screw feeding the granular or powdery plastic material from the feeding hopper 11 into the mixing and plasticating cylinder. FIG. 7 illustrates the machine as in FIG. 3 after completed pressing-out process or injection process, with the orifice open. The orifice of the machine may be pressed against the runner opening of an injection mold as is usual in the case of injection molding machines (not illustrated in the figure).

FIG. 8 illustrates the machine according to FIG. 7 with the pressing piston and the mixing and plasticating rotor in mixing or plasticating position and with closed orifice. From the figure it is seen that the pressing piston after completed feeding process may be moved forward so far, that the feeding opening with the feeding screw is completely closed.

At the same time, plastic material in granular form or powder form may be compressed as desired and put under pressure and, thus, the mixing or plasticating process is extremely intensified. From FIG. 8 it is seen that the mixing and plasticating chamber may be completely closed during the mixing or plasticating process. Thus, a leak-flow or back-flow is eliminated. However, if on the other hand a degassing or dehumidification of the material should be necessary or desirable during the mixing or plasticating process, a degassing opening may be easily provided by corresponding pull-back of the pressing piston. If the pressing piston and the mixing and plasticating rotor of FIG. 8 are pulled out of the mixing and plasticating cylinder, as already illustrated in FIG. 6, the mixing and plasticating cylinder may be fed with plastic material in piece form, rod form or bale form. Thus, for example, solid cylindrical thermoplastic rods or thermosetting moulding compound in the form of tablets may be filled into the mixing and plasticating cylinder and then the mixing and plasticating rotor and the pressing piston are moved forward into the starting position illustrated in FIG. 4. Thereafter, the plastic material may be plasticated by the friction heat alone, which is generated by the mixing and plasticating rotor, this being desirable particularly in the case of heat sensitive materials. The plasticating process is of course accelerated by heating of the mixing and plasticating cylinder and/or the mixing and plasticating rotor in the usual manner. As the mixing and plasticating rotor provides an extremely efficient material transfer and heat transfer in the mixing and plasticating cylinder, also very large amounts of material may be homogeneously plasticated in a very short time. The plasticating efficiency is many times greater than the plasticating performance of the screw plasticating machines of prior art. The machine according to the present invention is a.o. also particularly useful for the injection molding or pressure molding of thermosetting plastic compounds. These may be fed into the rear opening of the mixing and plasticating cylinder in the form of powder or tablets, the pressing piston and the mixing and plasticating rotor according to FIG. 6 being pulled out of the mixing and plasticating cylinder. Due to the heat sensitivity of the thermosetting plastic compounds the plasticating process, if desired, may be achieved by the frictional work alone of the mixing and plasticating rotor. If the thermosetting material due to any operational disturbances should set during the plasticating process, the machine may be extremely simply and rapidly cleaned, as described above. The same applies of course also to elastomer moulding compounds, e.g., on the base of rubber, silicone or polyurethane, which under certain circumstances could preset.

The rotary drive of the mixing and plasticating rotor 27 may also be axially not movable, the shaft 9 of the axially movable mixing and plasticating rotor being engaged with the rotary drive and axially movable in relation to the latter. The shaft may be a splined shaft and it may be axially moved in a splined hub of the rotary drive by action of the working cylinder 17. The shaft 9 of the mixing and plasticating rotor may also be firmly connected to the piston rod 18 of the working cylinder 17, as is common in the case of prior art screw plasticating machines, so that the working piston of the working cylinder 17 rotates together with the shaft 9 at the axial movement.

The movements of the mixing and plasticating rotor and the pressing piston may of course be electronically controlled, e.g., by punch card control, numerical control or computer control, thus, a fully automatic performance of the machine of the present invention is accomplished.

The machine according to the present invention may of course also be build vertically. For the relative motion of the axially movable parts of the machine one may also use, e.g., a frame-type press instead of the tie rod type press mentioned, the axially movable parts of the machine being guided between the frames on sliding rails, sliding platens or other guiding elements of any kind.

While specific embodiments of the invention have been shown and described in detail to illustrate the application of the invention principles, it will be understood that the invention may be embodied otherwise without departing from such principles.

What is claimed is:

1. Machine for mixing, plasticating and pressing out of plastics, rubber and other highly viscous materials at controlled pressure, which comprises a mixing and plasticating cylinder, an axially movable mixing and plasticating rotor with passages of any desired cross-sectional configuration, the shaft of said mixing and plasticating rotor extending outward through one end of the cylinder and being axially slidable with respect to the cylinder being connected to a rotary drive outside said mixing and plasticating cylinder, and an axially movable pressing piston mounted in the cylinder, said mixing and plasticating rotor and said pressing piston being axially movable independently of each other in said mixing and plasticating cylinder.

2. The machine according to claim 1, wherein said pressing piston is guided on at least two tie-rods and is axially moved on said tie-rods by at least one double-action working cylinder.

3. The machine according to claim 1, wherein said rotary drive of said mixing and plasticating rotor is guided on at least two tie-rods and is axially moved on said tie rods by at least one double-action working cylinder.

4. The machine according to claim 1, which comprises two fixed platens, said platens being connected by at least two tie rods, three platens which are axially movable on said tie rods, a double-action working cylinder, which is mounted at one of said fixed platens, and two side-mounted double-action working cylinders, the latter being mounted between one of said axially movable platens and said fixed platen, said pressing piston being mounted at said axially movable platen, said mixing and plasticating cylinder being mounted at said fixed platen and said rotary drive being mounted between two of said axially movable platens.

5. The machine according to claim 1, wherein said mixing and plasticating cylinder is provided with a feeding hopper with a feeding ram or a feeding screw.

6. The machine according to claim 1, wherein said mixing and plasticating rotor and said pressing piston are hollow and are cooled or heated.

7. The machine according to claim 1, wherein said passages of said mixing and plasticating rotor are cylindrical or conical bores.

8. The machine according to claim 1, wherein said passages of said mixing and plasticating rotor are of slot cross-section or polygonal cross-section.

9. Machine for mixing, plasticating and pressing out of plastics, rubber and other highly viscous materials at controlled pressure, which comprises a mixing and plasticating cylinder, an axially movable mixing and plasticating rotor with passages of any desired cross-sectional configuration, the shaft of said mixing and plasticating rotor being connected to a rotary drive outside said mixing and plasticating cylinder, and an axially movable pressing piston, said shaft of said mixing and plasticating rotor being guided through said pressing piston and the contents of said mixing and plasticating cylinder being pressed out through the end opening of said mixing and plasticating cylinder.

10. The machine according to claim 9, wherein the end opening of said mixing and plasticating cylinder is provided with a swivel-mounted platen as an end-closure.

11. The machine according to claim 9, wherein said end-closure of said mixing and plasticating cylinder is provided with a lockable orifice, the contents of said mixing and plasticating cylinder being pressed or injected through said orifice.

12. The machine according to claim 9, wherein said mixing and plasticating cylinder is provided with a feeding hopper with a feeding screw.

13. The machine according to claim 9, wherein said mixing and plasticating rotor and said pressing piston may be completely pulled out of said mixing and plasticating cylinder, said mixing and plasticating cylinder being freely accessible from at least one end opening.

14. The machine according to claim 9, wherein said mixing and plasticating rotor and said pressing piston may be pulled out of said mixing and plasticating cylinder together, so that said mixing and plasticating cylinder may be filled via the free end opening with plastic material in block form, rod form or tablet form.

15. The machine according to claim 9, wherein said pressing piston together with said mixing and plasticating rotor is axially moved, and further comprising a seal bushing surrounding said shaft in said pressing piston and being sealed by said mixing and plasticating rotor in valve-like manner.

16. Machine for mixing, plasticating and pressing out of plastics, rubber and other highly viscous materials at controlled pressure, which comprises a mixing and plasticating cylinder, an axially movable mixing and plasticating rotor with passages of any desired cross-sectional configuration, the shaft of said mixing and plasticating rotor being connected to a rotary drive outside said mixing and plasticating cylinder, and an axially movable pressing piston, said shaft of said mixing and plasticating rotor being guided through an end closure of said mixing and plasticating cylinder opposite to said pressing piston and the contents of said mixing and plasticating cylinder being pressed out through an opening of said mixing and plasticating cylinder.

17. The machine according to claim 16, wherein the contents of said mixing and plasticating cylinder are pressed out via a bore in said cylinder.

18. Machine for mixing, plasticating and pressing out of plastics, rubber and other highly viscous materials at controlled pressure, which comprises a mixing and plasticating cylinder, an axially movable mixing and plasticating rotor with passages of any desired cross-sectional configuration, the shaft of said mixing and plasticating rotor being drivingly connected to rotary drive outside said mixing and plasticating cylinder, said rotary drive being fixed with respect to the cylinder and axially movable pressing piston mounted in the cylinder, wherein said rotary drive of said axially movable mixing and plasticating rotor is immovable axially with respect to the cylinder, and said shaft of said axially movable mixing and plasticating rotor is drivingly engaged with said rotary drive and is axially movable in relation to said rotary drive.

19. The machine according to claim 18, wherein said shaft of said axially movable mixing and plasticating rotor is a splined shaft and is axially movable in a splined hub of said rotary drive by action of said working cylinder.

20. The machine according to claim 18, wherein said shaft of said axially movable mixing and plasticating rotor is firmly connected to the piston rod of said working cylinder, the working piston of said working cylinder rotating together with said shaft during the axial motion.

* * * * *